Patented Apr. 19, 1949

2,467,692

UNITED STATES PATENT OFFICE 2,467,692

NAPHTHYRIDONES AND PROCESSES FOR PREPARING THE SAME

Vladimir Alexander Petrow, Carshalton, England, assignor to Therapeutic Research Corporation of Great Britain Limited, London, England, a British company No Drawing. Application September 17, 1945, Serial No. 616,969. In Great Britain September 21, 1944

12 Claims. (Cl. 260—288)

This invention relates generally to novel chemical compounds and to processes of preparing the same; more specifically it relates to certain new naphthyridones and naphthyridines and to processes for obtaining these compounds.

It is an object of the present invention to provide new naphthyridones useful in the synthesis of naphthyridines possessing valuable therapeutic properties.

These new naphthyridenes conform to the formula:

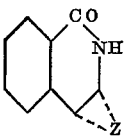

in which Z represents the residue of a heterocyclic ring selected from the class consisting of a pyridine nucleus having the nitrogen atom in the 7-position and a pyridine nucleus having the nitrogen atom in the 5-position. The fused rings in the above formula may carry additional 5- or 6-membered rings and/or additional substituents such for example as alkyl (e. g. methyl, ethyl or propyl), aryl (e. g. phenyl), aralkyl (e. g. benzyl, phenylethyl or phenylpropyl) and carboxy groups (e. g. acetyl, propionyl and benzoyl and the corresponding carbalkoxy groups) and halogen atoms (e. g. chlorine or bromine atoms).

In accordance with this invention, the new benznaphthyridones are obtained by treating a compound selected from the class consisting of 2- and 4-azafluorenones and the substitution products thereof with hydrazoic acid in the presence of a mineral acid, advantageously sulphuric acid. The hydrazoic acid may be employed as such or may be generated in situ by the use of a substance capable of furnishing hydrazoic acid under the conditions of the reaction, such, for example, as a soluble azide e. g. sodium azide.

The compounds herein designated as "azafluorenones," sometimes hitherto referred to as pyridofluorenones, can be regarded as fluorenones in which one of the benzene rings is replaced by a pyridine nucleus. To avoid ambiguity the standard fluorene numbering is adhered to. Thus:

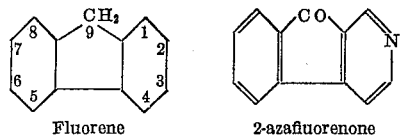

Fluorene       2-azafluorenone

The reaction may be illustrated by reference to the treatment of 2-aza-fluorenone, as follows:

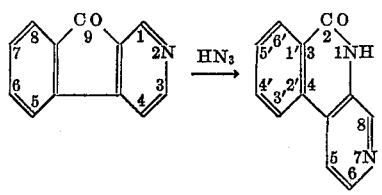

and/or

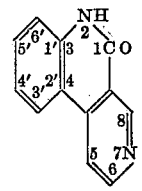

It is found in practice, under the operating conditions employed, that the 1:7-naphthyridone is formed in preponderating amount from 2-azafluorenone, but this invention includes the production, isolation and use of either or both isomerides and mixtures thereof.

The process of the present invention may be carried out by the addition of a strong aqueous solution of a soluble azide, for example sodium azide, in quantity somewhat greater than one molecular proportion, to a solution or suspension of the aza-fluorenone in sulphuric acid, with stirring and cooling. Alternatively, a solution of hydrazoic acid in a suitable inert solvent may be added, with stirring, to a cooled solution or suspension of the aza-fluorenone in sulphuric acid. The quantity of hydrazoic acid employed in preferably somewhat in excess of one molecular proportion.

Reaction is indicated by the evolution of nitrogen which may take place over a period of some hours. After allowing the reaction to go to completion, and standing at room temperature for some hours should this be necessary, the resultant benznaphthyridone may be isolated by pouring the reaction mixture on to a suitable quantity of cracked ice, or by equivalent procedure, whereby the required benz-naphthyridone separates in the form of its sulphate. The product is collected and the base regenerated as by treatment with alkali in aqueous solution. Alternatively, isolation of the required product may be effected by dilution of the reaction mixture by pouring on to ice, followed by precipitation of the base or its sulphate by the addition of an excess of a suitable alkali. In the case, for instance, of 4-carbethoxy-1:3-dimethyl-2-azafluorenone the required product is obtained by pouring on to ice and adding ammonia in excess, whereby the sulphate is precipitated and can be collected, washed, and dissolved in hot 5% solution of sodium hydroxide, the base being then precipitated on saturation with carbon dioxide.

According to a further feature of this invention, the benz-naphthyridones are converted into the corresponding halogen-benz-naphthyridines which may then be employed for the production of other substituted benznaphthyridines. Preparation of the halogen derivatives may be effected by methods known for the conversion of hydroxy-pyridine, -quinoline and -phenanthrine derivatives into the corresponding halogen compounds. Alternatively, the halogen derivatives may be readily prepared by heating the benznaphthyridone with one molecular proportion of a phosphorus pentahalide in phosphorus oxyhalide suspension at elevated temperature, e. g. 170 to 190° C., in a closed vessel.

This invention includes within its scope the conversion of the aforesaid halogen compounds with ammonia, amines or phenols to yield the correspondingly substituted benznaphthyridines having utility in the field of chemotherapy. Especially important are the benznaphthyridines of the type:

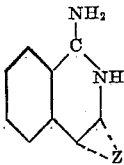

where Z has the significance hereinbefore defined. As an example of compounds of this type may be cited 2-amino-6:8-dimethyl-3:4-benzo-1:7-naphthyridine which, quite unexpectedly, has valuable therapeutic properties. These amino compounds are obtainable, for example, by treating with ammonia a 2-halogeno-3:4-benzo-1:7-naphthyridine. By way of illustration the 6:8-dimethyl compound above referred to may be prepared for example by heating a 2-halogeno-6:8-dimethyl-3:4-benzo-1:7-naphthyridine, preferably the 2-chloro compound, with saturated alcoholic ammonia and a trace of copper acetate in a closed vessel at elevated temperature until the reaction is completed. The reaction product is isolated and purified following customary methods of procedure, one of which is illustrated in the following examples.

The processes of the present invention are illustrated by the following non-limitative examples:

*Example I*

1:3-dimethyl-2-azafluorenone (80 g.) dissolved in concentrated sulphuric acid (500 ml.) was treated with stirring at a temperature of below 10° C. with a solution of sodium azide (45 g.) dissolved in water (125 ml.) added dropwise over a period of four hours. Rapid evolution of nitrogen occurred, the reaction being largely over after a total of eight hours. After standing overnight the mixture was poured into crushed ice (1250 g.) and after standing overnight the precipitated microcrystalline sulphate collected. It was decomposed with dilute ammonia on the water bath and the regenerated base collected and extracted with spirit (800 ml.). The product, M. P. 305–308° C. was sufficiently pure for conversion into the chloro-compound as hereinafter described. It may, however, be recrystallised, if desired, either from nitro-benzene or from a very large volume of alcohol, separating in needles, M. P. 319–320° C. The resulting benznaphthyridone has the structure shown:

and is thus 6:8-dimethyl-3:4-benzo-1:7-naphthyrid-2-one.

*Example II*

The finely powdered base (3 g.) obtained by the process of Example I, and phosphorus oxychloride (18 ml.) were heated in a sealed tube at 180° C. for 6 hours. The phosphorus halides were removed in vacuo on the water bath. The residual oil was decomposed with ice, made alkaline with water, dried, and the chloroform removed. The crude chloro-compound was obtained pure in glancing white needles by crystallisation (Norit) from light petroleum (B. P. 100–120° C.), (M. P. 153–154° C.). It is 2-chloro-6:8-dimethyl-3:4-benzo-1:7-naphthyridine.

*Example III*

The finely powdered base (3 g.) obtained by the process of Example I, phosphorus pentachloride (4 g.), and phosphorus oxychloride (22 ml.) were heated in a sealed tube at 180° C. for four hours. After being allowed to cool overnight the crystalline material which had separated was collected, decomposed with ice-ammonia, extracted with chloroform and the chloroform extracts treated as in Example II.

*Example IV*

The chloro-compound (1.2 g.) obtainable by the process of Example II or III, was heated in phenol at 180° C. for 5 hours. The product was treated with excess alkali and extracted with chloroform. Removal of the chloroform left a resinous oil which was extracted twice (20 ml. per portion) with light petroleum (B. P. 100–120° C.). The residue after removal of the petroleum on treatment with alcoholic picric acid in alcoholic solution gave the picrate (bright yellow plates from spirit, M. P. 203–203.5° C.) of the phenoxy-derivative. The regenerated base formed glancing white needles from light petroleum, M. P. 112–113° C. It is 2-phenoxy-6:8-dimethyl-3:4-benzo-1:7-naphthyridine.

*Example V*

The chloro-compound (1.5 g.) of Example II or III and piperidine (9 ml.) were heated in a sealed tube at 180° C. for 5 hours. The product was taken to dryness, a few drops of alkali added and the neutral mixture treated in alcoholic solution with alcoholic picric acid. The picrate of the piperidino-compound separated, yellow plates from alcohol, M. P. 228–229° C. The regenerated base formed octahedra from a little light petroleum, M. P. 113.5–114.5° C. It is 2-piperidine-6:8-dimethyl-3:4-benzo-1:7-naphthyridine.

*Example VI*

The chloro-compound (2.7 g.) of Example II or III, saturated alcoholic ammonia (15 ml.) and a trace of copper acetate were heated in a sealed tube at 180–190° C. for 16 hours. The product was taken to dryness, extracted with water (charcoal), and made alkaline with sodium hydroxide. The precipitated base (2-amino-6:8-dimethyl-3:4-benzo-1:7-naphthyridine), purified via the picrate (silky yellow needles from spirit, M. P. 261–262° C. (with decomposition), formed cubes from light petroleum, M. P. 189.5–190.5° C. The dihydrochloride formed octahedra from aqueous alcoholic hydrogen chloride, M. P. 310° C.

*Example VII*

4 - carboethoxy - 1:3 - dimethyl - 2 - azafluorenone (160 g.) dissolved in concentrated sulphuric acid (750 ml.) was treated with stirring at a temperature of below 10° with a solution of sodium azide (68 g.) dissolved in water (190 ml.) added crop-wise over a period of four hours. Rapid evolution of nitrogen occurred slowing down after a total of eight hours stirring and cooling. After standing overnight the product was poured into ice and ammonia added in excess. The precipitated sulphate was collected, dissolved in the minimum amount of hot 5% solution of sodium hydroxide and the liquid filtered, cooled and saturated with carbon dioxide. The precipitated base (4-carbethoxy-6:8-dimethyl-3:4-benzo-1:7-naphthyrid-2-one, the tautomeric enolic form being 4-carbethoxy-6:8-dimethyl-3:4-benzo-2-hydroxy-1:7-naphthyridine) was collected and after three recrystallisations from alcohol, was obtained as a felted mass of silky white needles, M. P. 255–256° C.

The invention is not restricted to the foregoing examples. For example, the preparation of halogeno-benznaphthyridines according to Examples II and III may be effected at normal pressure, viz. in an open vessel by the use as reaction medium of a suitable inert high-boiling solvent such, for example, as nitrobenzene or a dialkyl-aniline, e. g. diethylaniline. Again, amination of said halogeno-benznaphthyridines may be effected in a sealed vessel using concentrated ammonia (0.88 s. g.), for example, in place of alcoholic ammonia; other soluble copper salts in addition to copper acetate may likewise be employed and, in some cases, the use of a copper salt may be omitted.

Reference is made to my co-pending application Serial No. 760,934, filed July 14, 1947, where the amino benznaphthyridines disclosed herein are claimed.

I claim:

1. Naphthyridones conforming to the formula

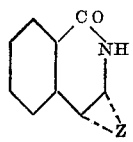

in which Z represents the residue of a heterocyclic ring selected from the class consisting of a pyridine nucleus having the nitrogen atom in the 7-position and a pyridine nucleus having the nitrogen atom in the 5-position.

2. A naphthyridone conforming to the formula

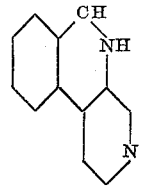

3. A naphthyridone conforming to the formula

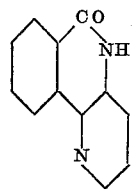

4. Process for the manufacture of naphthyridones which comprises treating substances selected from the class consisting of compounds containing 2-aza-fluorenone and compounds containing 4-aza-fluorenone nuclei with hydrazoic acid in the presence of a mineral acid.

5. Process for the manufacture of naphthyridones which comprises treating substances selected from the class consisting of compounds containing 2-aza-fluorenone and compounds containing 4-aza-fluorenone nuclei with hydrazoic acid in the presence of sulphuric acid.

6. Process as claimed in claim 4 wherein the hydrazoic acid is generated in situ.

7. Process for the manufacture of naphthyridones which comprises treating a substance selected from the class consisting of compounds containing 2-aza-fluorenone and compounds containing 4-aza-fluorenone nuclei with a soluble azide in aqueous solution in the presence of a mineral acid.

8. A process for the manufacture of naphthyridones wherein a strong aqueous solution of a soluble azide, in quantity greater than one molecular proportion, is added to a substance selected from the class consisting of compounds containing 2-aza-fluorenone and compounds containing 4-aza-fluorenone nuclei in sulphuric acid medium, with stirring and cooling.

9. A process for the manufacture of naphthyridones wherein a strong aqueous solution of sodium azide, in quantity greater than one molecular proportion, is added to a substance selected from the class consisting of compounds containing 2-aza-fluorenone and compounds containing 4-aza-fluorenone nuclei in sulphuric acid medium, with stirring and cooling.

10. Process for the manufacture of naphthyridones wherein a solution of hydrazoic acid in an inert solvent is added with stirring to a substance selected from the class consisting of compounds containing 2-aza-fluorenone and compounds containing 4-aza-fluorenone nuclei in sulphuric acid medium, the quantity of hydrazoic acid being in excess of one molecular proportion.

11. Process for the production of 1:7-naphthyridones which comprises treating a substance selected from the class consisting of compounds containing 1:3-dimethyl-2-aza-fluorenone nuclei with hydrazoic acid in the presence of a mineral acid and isolating the 1:7-naphthyridone from the reaction mixture.

12. Process for the production of 1:7-naphthyridones which comprises treating a substance selected from the class consisting of compounds containing 1:3-dimethyl - 2 - aza-fluorenone nuclei with a soluble azide in aqueous solution in the presence of a mineral acid and isolating the 1:7-naphthyridone from the reaction mixture.

VLADIMIR ALEXANDER PETROW.

REFERENCES CITED

The following references are of record in the file of this patent:

FOREIGN PATENTS

| Number | Country | Date |
|---|---|---|
| 282,143 | Great Britain | Dec. 12, 1927 |
| 351,068 | Great Britain | June 22, 1931 |